Oct. 18, 1938.     J. R. HOLMES     2,133,514
ENGINE COOLING SYSTEM
Filed Sept. 30, 1936
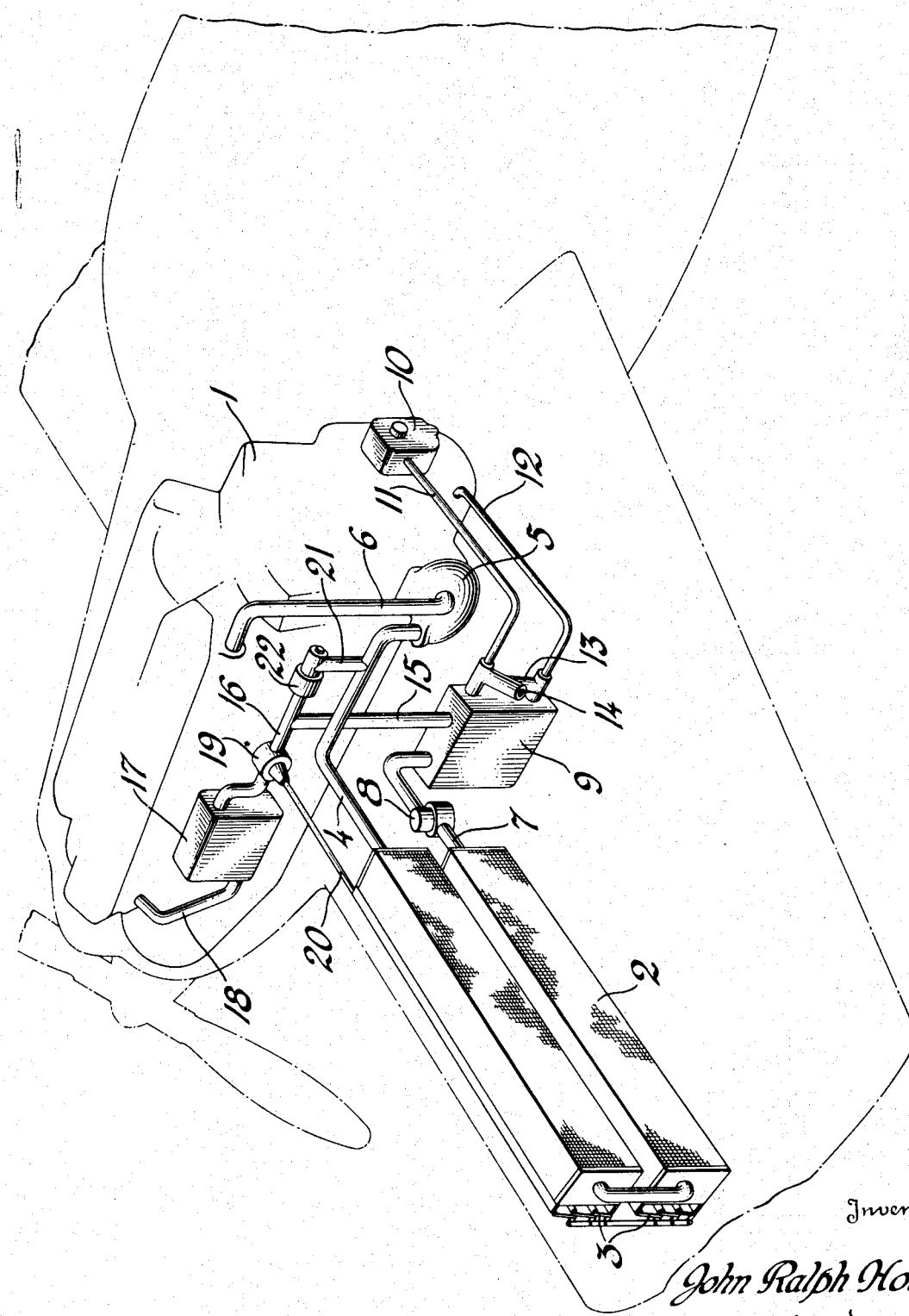
Inventor
John Ralph Holmes
By Blackmore, Spencer & Flint
Attorneys Patented Oct. 18, 1938

2,133,514

UNITED STATES PATENT OFFICE 2,133,514

ENGINE COOLING SYSTEM

John Ralph Holmes, Lockport, N. Y., assignor to General Motors Corporation, Detroit, Mich., a corporation of Delaware Application September 30, 1936, Serial No. 103,320

13 Claims. (Cl. 123—178)

This invention relates to temperature regulating systems for engines and is intended primarily for application to aircraft. The system involves the forced circulation of cooling liquid, there being an engine driven pump to insure continuous liquid flow through the jacketed cylinder block throughout engine operation. For the dissipation of heat absorbed in the engine an air cooled radiator receives a portion or all of the circulating liquid in accordance with cooling requirements, the extent of heat extraction being also dependent upon the volume of air passing through the radiator. An additional heat transfer unit may be utilized for the exchange of heat between the liquid in the cooling system and the engine lubricant.

The feature of particular importance is the arrangement for regulating the flow of liquid and air to the radiator for automatic control of the heat transfer action to maintain substantially constant engine temperature under varying conditions encountered in airplane maneuver and travel. According to the preferred embodiment, the adjustment for air flow is effected through shutters operated by thermally responsive means which opens and closes the shutters in direct relation to temperature rise and fall of the liquid entering the engine jacket. The volume of liquid passing through the radiator is made dependent upon temperature of the outgoing liquid, a damper valve being actuated by a thermal responsive device to decrease liquid flow in direct relation to liquid temperature rise. By bringing the liquid from the radiator in heat exchanging relation with the lubricant, special benefits are had in that the oil is warmed quickly when starting the engine and cooled when heat rejection from the engine demands it. Thus the engine cooling liquid serves as a cooling or heating medium in accordance with oil temperature requirements.

For a better understanding of the system reference should be made to the accompanying drawing showing in perspective the interconnection and relation of the several parts in an airplane installation.

It may be mentioned incidentally that there is contemplated the use as a coolant of a high boiling point anti-freeze solution as, for example, ethylene glycol or a similar liquid.

In the drawing the outline of an airplane is indicated by broken lines with the engine 1 for driving the propeller located in the nose of the fuselage and the heat dissipating unit or radiator 2 located within one of the hollow wings of the plane. The wing additionally is provided with an air duct or ducts leading to and from the radiator assembly and the passage of cooling air therethrough is controlled by suitable doors or pivoted shutters as shown at 3.

Cooling liquid enters the radiator assembly through the conduit or inlet pipe 4 leading from the pressure side of an engine driven pump 5 whose suction side is connected by the conduit 6 with the outlet from the engine jacket. The return connection to the engine from the radiator includes a conduit 7 having therein a reverse acting thermostatically controlled valve or damper 8 which serves to throttle the flow as the outlet temperature increases. The conduit 7 leads to the inlet of a heat exchanger 9 of a well known type adapted for the transfer of heat between the engine cooling liquid and the engine lubricating oil. The engine lubricating oil is fed from the crankcase by an engine driven pump 10 through a pipe 11 to the heat exchanger 9 and is returned through the pipe 12 to the engine crankcase for supply to the moving parts to be lubricated. As a safety factor in the event the lubricant within the heat exchanger 9 is congealed or because of other obstruction, a passageway 13 connects the inlet and outlet pipes 11 and 12 and is controlled by a pressure valve 14 which opens automatically upon the presence of back pressure and allows the oil to by-pass the heat exchanger 9.

The cooling liquid outlet of the heat exchanger is connected through the pipe 15 with the conduit 16 leading to the expansion tank 17 which in turn empties through the conduit 18 into the engine jacket intake. Located in the return pipe 16 is a thermal responsive device 19 which acts through the rod 20 to operate the air shutters 3 so that the shutters are opened for the flow of air through the radiator as the temperature of the liquid returning to the engine jacket increases. Connecting the jacket outlet pipe 4 with the return line 16 is a conduit 21 having therein a pressure operated valve 22 which opens at a given pressure to by-pass engine cooling liquid around both the radiator 2 and the heat exchanger 9.

When the system is cold the thermostat 19 holds the shutters in closed position and the reverse acting valve 8 is in wide open position. Upon the start of engine operation, the oil pump 10 forces lubricating oil under pressure through the line 11 to the heat exchanger for return through the line 12. Should resistance to flow through the heat exchanger 9 be great the pressure valve 14 opens and allows the oil to bypass the heat exchanger through the conduit 13. At the same time the engine driven pump 5 draws water from the engine block through the line 6, and delivers it to the radiator through the conduit 4. The by-pass valve 22 will remain closed inasmuch as the valve 8 is in maximum open position and allows all the liquid delivered by the pump 5 to flow through the radiator and heat exchanger 9 for return through the conduit 16 to the engine jacket.

With the shutters closed the heat generated by the engine will be stored in the cooling liquid for a quick warm up of the engine. Assisting in quick warm up will be the rise in temperature of the engine oil imparted to it through the heat exchanger 9. In other words as the warm liquid passing through the radiator without being cooled, flows through the heat exchanger 9, some of its heat will be transferred to the engine oil, the circulation of oil therethrough being established as the oil therein warms up and the pressure drop thereacross becomes less than the force necessary to hold the by-pass valve 14 open.

In the approach to proper operating temperature, the reverse acting valve 8 starts throttling the flow of coolant through the radiator 2 tending to hold a predetermined temperature of the coolant delivered to the heat exchanger 9. The oil temperature continues rising and the change over to oil cooling may take place. As the oil contacts with the internal working parts of the engine and absorbs additional heat, the temperature of the coolant is also on the increase and the valve 8 gradually cuts down flow to the point where the back pressure in the line 4 causes the pressure valve 22 to open and divert from the radiator a portion of the flow. When the coolant temperature back to the engine reaches a preselected point the thermal element 19 actuates the shutters toward open position. Air flow through the radiator 2 extracts heat from the coolant passing through the radiator and lowers the temperature at the outlet side whereupon the reverse acting valve stars opening again and at this point actual oil cooling starts, provided the temperature of the oil exceeds that of the coolant.

In normal operation the action of the liquid flow damper 8 and the air flow damper 3 balance each other to insure proper engine operating temperatures. The shutter thermostat 19 governs the position of the shutters to admit the necessary amount of air for heat dissipation in the radiator 2 for holding a predetermined coolant range in the circuit. Shutter position may vary to accommodate airplane speed, engine load, slope of flight or ambient temperature. The thermostatically controlled reverse acting valve holds the temperature of the coolant to the oil heat exchanger constant by varying the flow and the pressure relief valve 22 compensates for the action of the reverse acting valve 8.

By way of an example of how the system operates, it may be stated that a practical embodiment of the invention as applied to airplane engines whose cooling system contains ethylene glycol involves the use of a circulating pump 5 having a rated capacity of 180 g.p.m.; the use of a thermostatic valve 8 which starts to throttle at 140° F. and reaches a maximum throttle position at 163° F., in which position only 30 g.p.m of the cooling liquid flows through the radiator 2 and the use of a shutter thermostat 19, which starts to open the shutters at 225° F. and holds the shutters wide open at 243° F. With the parts selected as indicated from a cold start the heat absorbed by the ethylene glycol will be transferred to the oil in the exchanger 9 with a resultant cooling of the ethylene glycol and warming of the oil. When the ethylene glycol temperature at 8 reaches 143° F. the throttling action begins and a portion of the ethylene glycol passes the valve 22 with no cooling action thereon and mixes with the cooled ethylene glycol from the exchanger 9; the mixture passing the thermostat and returning to the engine jacket. With continued operation the ethylene glycol temperature rises and the valve 8 reaches maximum throttle position, passing only a small proportion of the ethylene glycol through the exchanger 9 for mixture with the larger quantity of uncooled ethylene glycol by-passed at the valve 22. Likewise the oil temperature rises until warming of the oil in the exchanger 9 drops off and changes over to oil cooling. Dissipation of heat to the air is called for when the temperature of the ethylene glycol at 19 returning to the engine jacket reaches 225° F., whereupon the shutters 3 start to open and cooling takes place in the radiator 2. Thereafter the valve 8 by controlling the amount of ethylene glycol flow through the radiator 2 and by-pass 21, respectively, in accordance with temperature at the radiator outlet regulates the temperature at 19 and the dissipation of excess heat and maintains the oil temperature substantially constant. The radiator 2 is calculated to remove all excess heat under the most severe operating conditions with the total heat extraction from the ethylene glycol from the 30 g.p.m. flowing through the radiator of the total 181 g.p.m. circulated by the pump. Because of this, engine jacket operating temperatures can be relatively high for maximum engine efficiency and yet there will be a large temperature difference between the ethylene glycol and lubricating oil entering the heat exchanger 9. With a decrease in ethylene glycol flow through the radiator its outlet temperature is lowered thereby increasing the efficiency of oil cooling in the heat exchanger 9.

From the above it will be seen that when engine operation calls for heat dissipation the ethylene glycol flow from the pump is divided between the air cooled radiator 2 and the by-pass 21. That portion which flows through the radiator will undergo a large drop in temperature while that flowing through the by-pass remains uncooled. Both enter the return passage 16 for flow to the engine jacket, the return flow then consisting of a mixture of the cooled and uncooled portions. The net result is a temperature drop of the ethylene glycol in its movement from the jacket outlet pipe 6 to the jacket inlet pipe 18.

From the above description it will be apparent that there has been provided an entirely self-regulated system that reduces the warm up period and controls the temperature of both the engine jacket coolant and the lubricating oil to favorable limits for all conditions of initial warming up and actual flight of the aircraft.

I claim:

1. A heat transfer system of the character described, including a heat exchanger adapted for the transfer of heat from one fluid to another fluid, and means controlled by the temperature of one of said fluids to vary the flow volumes of both fluids to the heat exchanger in inverse relation.

2. In a heat transfer system of the character described, including a heat exchanger adapted for the transfer of heat from one fluid to another fluid, temperature controlled means governing the volume of flow of one of the fluids and operating means also controlled by temperature to vary the flow of the other fluid in inverse relation to the flow volume of the first mentioned fluid.

3. In a heat transfer system, a heat exchanger, means controlling the volume of flow to the heat exchanger of heat extracting fluid, other means controlling the volume of flow to the heat exchanger of heat delivering fluid, and operating mechanism for said control means acting automatically with temperature rise of the heat delivering fluid to increase the volume of heat extracting fluid flow and decrease the volume of heat delivering fluid flow.

4. An engine cooling system, including an engine jacket to contain a cooling liquid, a radiator having inlet and outlet conduits connected with the engine jacket, system temperature operated air flow damper mechanism associated with the radiator, a reverse acting temperature operated damper governing liquid flow through the radiator, a radiator by-pass connecting said inlet and outlet conduits and a pressure operated valve controlling flow through the by-pass.

5. An engine cooling system, including an engine jacket to contain a cooling liquid, a radiator having inlet and outlet conduits connected with the engine jacket, system temperature operated air flow damper mechanism associated with the radiator, a reverse acting temperature operated damper governing liquid flow through the radiator, an oil temperature regulator interposed between the radiator and engine jacket and constituting a part of the radiator outlet conduit, and pressure operated valved means communicating the inlet and outlet conduits to by-pass both the radiator and the oil temperature regulator.

6. In combination, an engine cooling jacket, a radiator having a connection with the jacket outlet, air flow damper mechanism associated with the radiator, an oil temperature regulator having a connection with the radiator outlet, means operated by a temperature rise in said connection to throttle liquid flow from the radiator to the oil temperature regulator, a connection between the oil temperature regulator outlet and the jacket inlet, a pressure operated by-pass conduit between the first and last mentioned connections, and a temperature responsive device in said last mentioned connection for operating the air flow damper mechanism.

7. In combination, an engine having a cooling jacket, a radiator having inlet and return connections with the jacket, an engine driven pump to deliver cooling medium from the jacket through the inlet connection to the radiator, an oil temperature regulator interposed in said return connection, means between the radiator and oil temperature regulator to throttle flow of cooling medium to the regulator upon a predetermined temperature rise of such medium, a pressure operated valved passage joining the inlet and return connections in by-passing relation with both the radiator and the oil temperature regulator, and means operated in response to temperature changes of the cooling medium beyond said passage to regulate the supply of air to the radiator.

8. In an engine cooling system, a circuit for the flow of cooling liquid, an oil temperature regulator in said circuit, an air cooled radiator also in the circuit, means to increase air flow through the radiator in direct relation to liquid temperature rise and means to decrease liquid flow through the radiator and said oil temperature regulator in direct relation to liquid temperature rise.

9. In a liquid circulatory system for the cooling of engines, an oil temperature regulator and an air cooled radiator connected in said system for heat exchange, temperature controlled means to decrease the volume of liquid flow between the air cooled radiator and oil temperature regulator in direct relation to liquid temperature increase and temperature controlled means to increase air flow through the radiator upon liquid temperature increase.

10. In combination, a pair of independent liquid circulating systems, a heat exchanger associated with both systems for the transfer of heat between the liquids in the respective systems, an air cooled radiator in one system connected with said heat exchanger for heat transfer, and means active in response to liquid temperature changes for varying the volumes of air and liquid flow through the radiator in inverse relations.

11. In an engine cooling system, an air cooled radiator to receive engine cooling liquid, means operated by liquid temperature at the radiator outlet to throttle liquid flow through the radiator in direct relation to liquid temperature increase, and means also operated by liquid temperature to increase air flow through the radiator in direct relation to liquid temperature increase.

12. In a heat transfer system of the character described, a heat exchanger adapted for the dissipation of heat from one fluid to another fluid, inlet and outlet connections with said exchanger for the flow of one of said fluids, and means governed by the exchanger outlet flow temperature to vary the flow volumes of both fluids in inverse relation.

13. In a heat transfer system of the character described, a heat exchanger adapted for the dissipation of heat from one fluid to another fluid, inlet and outlet connections with said exchanger for the flow of one of said fluids, means responsive to the temperature of fluid flow in said outlet to throttle said flow upon temperature increase, and temperature responsive means active upon temperature increase of said fluid flow to increase flow through the heat exchanger of the other fluid.

JOHN RALPH HOLMES.